(No Model.)
M. V. TEETOR.
SUPPORT FOR ENDLESS CLOTHES LINES.
No. 402,630. Patented May 7, 1889.
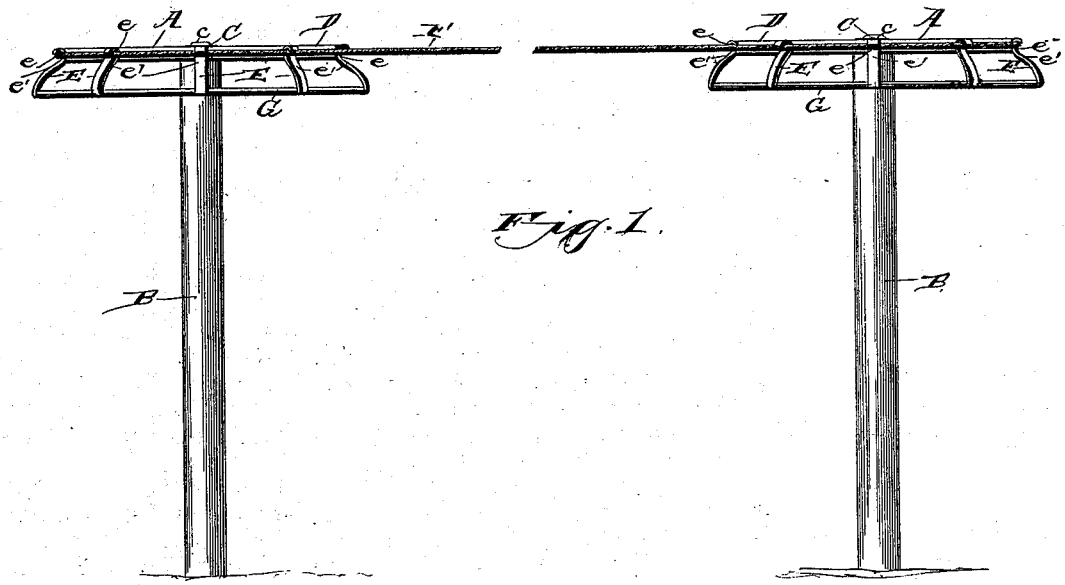
Fig. 1.
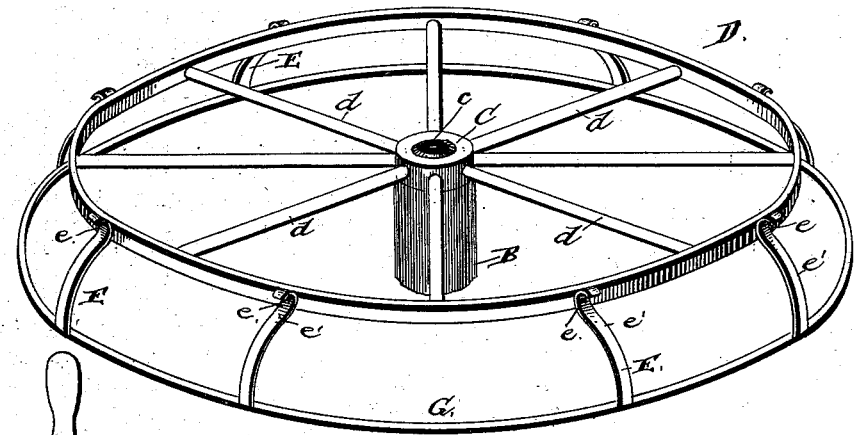
Fig. 2.
Fig. 3.
Witnesses
Inventor,
Martin V. Teetor.
By his Attorneys,

UNITED STATES PATENT OFFICE.

MARTIN V. TEETOR, OF SODUS, NEW YORK.

SUPPORT FOR ENDLESS CLOTHES-LINES.

SPECIFICATION forming part of Letters Patent No. 402,630, dated May 7, 1889.

Application filed May 5, 1888. Serial No. 272,986. (No model.)

*To all whom it may concern:*

Be it known that I, MARTIN V. TEETOR, a citizen of the United States, residing at Sodus, in the county of Wayne and State of New York, have invented new and useful Improvements in Supports for Endless Clothes-Lines, of which the following is a specification.

The invention relates to improvements in supports for endless clothes-lines, such as are looped and travel around end wheels; and it consists in the construction and novel combination of parts hereinafter described, illustrated in the accompanying drawings, and pointed out in the claim hereto appended.

Figure 1 of the drawings is a side elevation of a machine embodying the invention. Fig. 2 is an enlarged perspective view of one of the wheels detached. Fig. 3 is a side view of a modification of the operative end of the machine.

Referring to the drawings by letter, A A designate the end wheels pivoted upon the tops of posts B, of suitable height, at a proper or convenient distance apart, and constructed as follows: Each wheel has a central hub, C, suitably bushed, and turning on a pivotal pin, c, rising from the top of the corresponding post. From the hub stands out the radial arms or spokes d, the outer ends of which are properly secured to the rim D. The said spokes are preferably not less than eight in number and equidistant.

E E are depending arms, situated midway between the spokes and standing downward and outward from the rim, as shown, to the outer surface of which they are secured by rivets or otherwise. The upper ends of said arms rise above the rim, and the portions adjoining said ends are bent to form the outwardly-concave bearings e for the line F. The bottoms of the bearings are level with the rim, with which they are aligned, so that the line F, which is preferably of wire, will run upon the rim between the bearings e, and not form bends or angles therein. The arms E curve downward from the bearings, with their convexities or shoulders e' outward, and have their lower ends secured to the wire ring G a proper distance below the rim. The said ring, being larger than the rim, holds the upper portions of the clothes out from the line and separates them, so that there is less liability of entanglement between the clothes when passing around the wheels. The convexities or shoulders e' of the arms E direct the line F into the bearings e and prevent it from slipping downward.

Fig. 3 shows a modification, in which the nearer wheel to the operator has a short shaft passing through its hub and journaled in and between the arms of a yoke or fork, H, the shank h of which is secured to a proper support which may be adjacent to a window when the line is run out therefrom. In this case the said wheel is turned and the line caused to travel by means of a crank-handle on the extended end of the short shaft.

The operation is as follows: The wheel adjacent to the operator is turned by hand and the clothes are put, one after the other, on the outwardly-traveling side of the line, those first put on first passing around the outer wheel and coming back to the inner wheel on the inwardly-traveling side of the line, so that when dry they can be removed without the operator changing place.

Having described my invention I claim—.

The wheel of an endless clothes-line, composed of the central hub, the rim connected with the hub by radial spokes, the wire ring a suitable distance below and of larger diameter than the rim, and the arms connecting the rim and wire ring, having their upper ends extended somewhat above the rim, and bearings for the traveling line formed on their upper portions, which bearings are concave outwardly and aligned with the rim, so that the line will travel on the rim between the bearings and avoid making bends at the latter, substantially as specified.

In testimony that I claim the foregoing as my own I have hereto affixed my signature in presence of two witnesses.

MARTIN V. TEETOR.

Witnesses:
A. J. BARBER,
ISAAC DECKER.